(12) United States Patent
McCaffrey

(10) Patent No.: US 8,794,925 B2
(45) Date of Patent: Aug. 5, 2014

(54) ROOT REGION OF A BLADE FOR A GAS TURBINE ENGINE

(75) Inventor: Michael G. McCaffrey, Windsor, CT (US)

(73) Assignee: United Technologies Corporation, Hartford, CT (US)

( * ) Notice: Subject to any disclaimer, the term of this patent is extended or adjusted under 35 U.S.C. 154(b) by 885 days.

(21) Appl. No.: 12/862,708

(22) Filed: Aug. 24, 2010

(65) Prior Publication Data

US 2012/0051920 A1  Mar. 1, 2012

(51) Int. Cl.
*F01D 5/14* (2006.01)

(52) U.S. Cl.
USPC .............. 416/219 R; 416/229 AR; 416/229 R

(58) Field of Classification Search
USPC ...... 416/219 R, 224, 229 R, 229 A, 230, 239, 416/500, 193 A
See application file for complete search history.

(56) References Cited

U.S. PATENT DOCUMENTS

| | | |
|---|---|---|
| 3,458,387 A | 7/1969 | Suskind |
| 3,600,103 A | 8/1971 | Gray |
| 3,637,325 A | 1/1972 | Morley |
| 3,649,425 A | 3/1972 | Alexander |
| 3,679,324 A | 7/1972 | Stargardter |
| 3,699,623 A | 10/1972 | Kreider |
| 3,731,360 A | 5/1973 | Stone, Jr. |
| 3,752,600 A | 8/1973 | Walsh et al. |
| 3,756,745 A | 9/1973 | Alver et al. |
| 3,942,231 A | 3/1976 | Whitaker |
| 3,943,020 A | 3/1976 | Ashton et al. |
| 3,963,373 A | 6/1976 | Macauley |
| 4,029,838 A | 6/1977 | Chamis et al. |
| 4,037,990 A | 7/1977 | Harris |
| 4,040,770 A | 8/1977 | Carlson |
| 4,060,338 A | 11/1977 | Macauley |
| 4,108,572 A | 8/1978 | Platt |
| 4,146,663 A | 3/1979 | Ikeda et al. |
| 4,335,998 A | 6/1982 | Siebels |
| 4,343,593 A | 8/1982 | Harris |
| 4,416,949 A | 11/1983 | Gabellieri et al. |
| 4,417,854 A | 11/1983 | Cain et al. |
| 4,490,203 A | 12/1984 | Bose |
| 4,594,761 A | 6/1986 | Murphy et al. |
| 4,655,687 A | 4/1987 | Atkinson |
| 4,717,610 A | 1/1988 | Dennison |
| 4,908,494 A | 3/1990 | Faiz et al. |
| 4,929,154 A | 5/1990 | Wildner |
| 5,018,271 A | 5/1991 | Bailey et al. |
| 5,049,036 A | 9/1991 | Bailey et al. |
| 5,132,178 A | 7/1992 | Chyung et al. |
| 5,141,400 A | 8/1992 | Murphy et al. |
| 5,160,822 A | 11/1992 | Aleshin |
| 5,223,064 A | 6/1993 | Gadkaree |
| 5,225,015 A | 7/1993 | Allaire et al. |

(Continued)

FOREIGN PATENT DOCUMENTS

EP  0424988  2/1991

*Primary Examiner* — Edward Landrum
*Assistant Examiner* — Liam McDowell
(74) *Attorney, Agent, or Firm* — Carlson, Gaskey & Olds, P.C.

(57) ABSTRACT

A root region of an airfoil includes an inner ply layer group that extends from an innermost root region at least partially into an intermediate platform region, the inner ply layer group includes an outermost ply and an attachment ply layer group attached to the outermost ply.

13 Claims, 5 Drawing Sheets

(56) References Cited

U.S. PATENT DOCUMENTS

| | | | |
|---|---|---|---|
| 5,240,375 A | 8/1993 | Wayte | |
| 5,292,231 A | 3/1994 | Lauzeille | |
| 5,340,280 A | 8/1994 | Schilling | |
| 5,344,280 A | 9/1994 | Langenbrunner et al. | |
| 5,375,978 A | 12/1994 | Evans et al. | |
| 5,439,353 A | 8/1995 | Cook et al. | |
| 5,486,096 A | 1/1996 | Hertel et al. | |
| 5,503,703 A | 4/1996 | Dahotre et al. | |
| 5,553,518 A | 9/1996 | Henry et al. | |
| 5,573,377 A * | 11/1996 | Bond et al. | 416/229 A |
| 5,576,069 A | 11/1996 | Chen et al. | |
| 5,694,683 A | 12/1997 | Teets et al. | |
| 5,791,877 A | 8/1998 | Stenneler | |
| 5,839,882 A | 11/1998 | Finn et al. | |
| 5,876,651 A | 3/1999 | Blackburn, Jr. et al. | |
| 5,928,448 A | 7/1999 | Daws | |
| 5,947,094 A | 9/1999 | Atmur et al. | |
| 5,965,240 A | 10/1999 | Blackburn et al. | |
| 5,990,025 A | 11/1999 | Suyama et al. | |
| 6,004,101 A | 12/1999 | Schilling et al. | |
| 6,013,592 A | 1/2000 | Merrill et al. | |
| 6,030,563 A | 2/2000 | Strasser et al. | |
| 6,039,542 A | 3/2000 | Schilling et al. | |
| 6,067,859 A | 5/2000 | Kas et al. | |
| 6,132,542 A | 10/2000 | Cutler et al. | |
| 6,135,006 A | 10/2000 | Strasser et al. | |
| 6,144,008 A | 11/2000 | Rabinovich | |
| 6,223,524 B1 | 5/2001 | Durcan | |
| 6,290,466 B1 | 9/2001 | Ravenhall et al. | |
| 6,312,224 B1 * | 11/2001 | Knott et al. | 416/230 |
| 6,524,074 B2 | 2/2003 | Farrar et al. | |
| 6,536,109 B2 * | 3/2003 | Berthelet et al. | 29/889.1 |
| 6,617,013 B2 | 9/2003 | Morrison et al. | |
| 6,857,856 B2 | 2/2005 | Potter et al. | |
| 6,969,239 B2 | 11/2005 | Grant et al. | |
| 7,049,548 B1 | 5/2006 | Sjogren et al. | |
| 7,153,096 B2 | 12/2006 | Thompson et al. | |
| 7,258,530 B2 | 8/2007 | Morrison et al. | |
| 7,300,255 B2 | 11/2007 | Potter et al. | |
| 7,431,196 B2 | 10/2008 | Eilert et al. | |
| 7,600,979 B2 | 10/2009 | Steibel et al. | |
| 7,686,577 B2 | 3/2010 | Morrison et al. | |
| 7,754,126 B2 | 7/2010 | Subramanian et al. | |
| 8,435,007 B2 * | 5/2013 | Morrison | 416/193 A |
| 2006/0140771 A1 * | 6/2006 | Carper et al. | 416/241 R |
| 2007/0154317 A1 | 7/2007 | Cairo | |
| 2008/0187441 A1 * | 8/2008 | Schreiber | 416/229 R |
| 2010/0047061 A1 | 2/2010 | Morrison | |
| 2010/0054938 A1 | 3/2010 | Beckford et al. | |
| 2011/0027098 A1 * | 2/2011 | Noe et al. | 416/241 B |

* cited by examiner

ROOT REGION OF A BLADE FOR A GAS TURBINE ENGINE

BACKGROUND

The present disclosure relates to gas turbine engines and, more particularly, to blades therein.

In a gas turbine engine, air is compressed in various fan and compressor stages by rotor blades which cooperate with stator vanes. Fan air provides bypass propulsion thrust while compressor air is mixed with fuel and ignited for generation of hot combustion gases from which energy is extracted by a turbine section which powers the compressor and fan sections.

The turbine section often includes blades formed from Ceramic Matrix Composites which may have relatively low interlaminar properties such that attachment regions thereof may be subject to significant interlaminar stress.

SUMMARY

A root region of an airfoil according to an exemplary aspect of the present disclosure includes an inner ply layer group that extends from an innermost root region at least partially into an intermediate platform region, said inner ply layer group includes an outermost ply and an attachment ply layer group attached to the outermost ply.

A blade according to an exemplary aspect of the present disclosure includes an inner ply layer group that at least partially defines an innermost root region and an attachment ply layer group outboard of the inner ply layer group to define a remainder of the innermost root region.

A method of increasing an allowable Interlaminar Tensile (ILT) and Interlaminar Shear (ILS) stress of a blade according to an exemplary aspect of the present disclosure includes mounting an innermost root region within a disk attachment such that the innermost root region is in compression.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
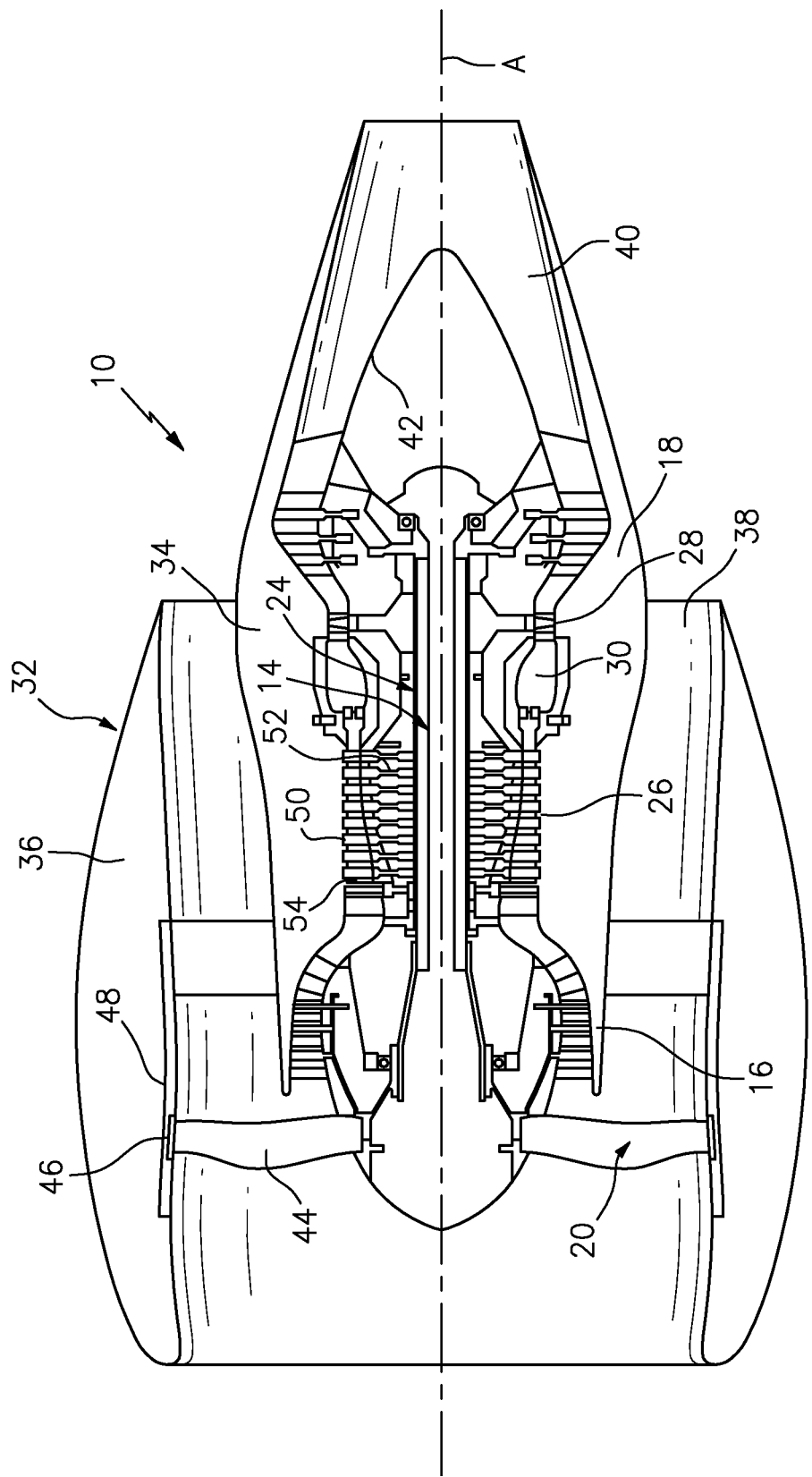
FIG. 1 is a general schematic view of an exemplary gas turbine engine for use with the present disclosure.

FIG. 1 illustrates a general schematic view of a gas turbine engine 10 such as a gas turbine engine for propulsion. The gas turbine engine 10 in the disclosed non-limiting embodiment is in the form of a two spool high bypass turbofan engine. While a particular type of gas turbine engine is illustrated, it should be understood that the disclosure is applicable to other gas turbine engine configurations, including, for example, gas turbines for power generation, turbojet engines, low bypass turbofan engines, turboshaft engines, etc.

The gas turbine engine 10 includes a core engine section that houses a low spool 14 and high spool 24. The low spool 14 includes a low pressure compressor 16 and a low pressure turbine 18. The core engine section drives a fan section 20 connected to the low spool 14 either directly or through a geared architecture. The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

The exemplary engine 10 may be mounted within a nacelle assembly 32 defined by a core nacelle 34 and a fan nacelle 36. The bypass flow fan air is discharged through a fan nozzle section 38 generally defined between the core nacelle 34 and a fan nacelle 36. Air compressed in the compressor 16, 26 is mixed with fuel, burned in the combustor 30, and expanded in the turbines 18, 28. The air compressed in the compressor 16, 26 and the fuel mixture expanded in the turbines 18, 28 may be referred to as a hot gas stream along a core gas path. The core exhaust gases are discharged from the core engine through a core exhaust nozzle 40 generally defined between the core nacelle 34 and a center plug 42 disposed coaxially therein around an engine longitudinal centerline axis A.

An annular blade containment structure 46 is typically disposed within a fan case 48 which circumferentially surrounds the path of the fan blades 44 to receive blade fragments which may be accidentally released and retained so as to prevent formation of free projectiles.

The compressor 16, 26 includes alternate rows of rotary airfoils or blades 50 mounted to disks 52 and static airfoils or vanes 54 which at least partially define a compressor stage. It should be understood that a multiple of disks 52 may be contained within each engine section and that although a single airfoil is illustrated and described in the disclosed embodiment, other stages which have other blades inclusive of high pressure compressor blades and low pressure compressor blades may also benefit herefrom.

Figure 2:
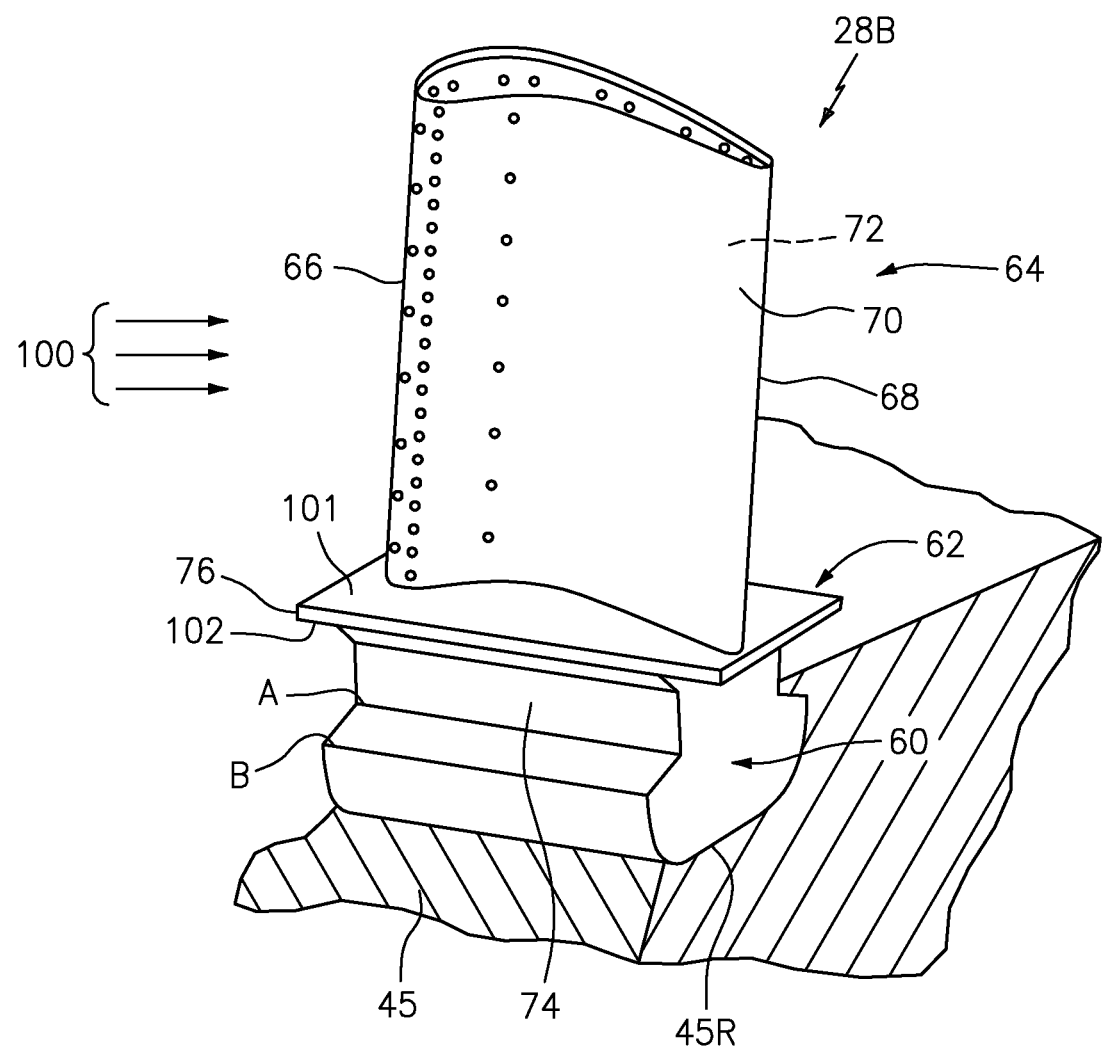
FIG. 2 is a perspective view of a turbine blade.

With reference to FIG. 2, a section of the engine 10 includes a plurality of circumferentially spaced blades 28B mounted to a disk 45 (one shown). The blade 28B generally includes an innermost root region 60, an intermediate platform region 62, and an outermost airfoil region 64. Although the blade disclosed herein in the illustrated non-limiting embodiment is a turbine blade from the turbine sections 18, 28, it should be understood that various blades which are manufactured from Ceramic Matrix Composites will also benefit herefrom.

In one form, the airfoil region 64 defines a blade chord between a leading edge 66 and a trailing edge 68. A concave pressure side 70 and a convex suction side 72 are defined between the leading edge 66 and the trailing edge 68. Hot, pressurized gas 100, is produced during the combustion of fuel and air in the combustor section 30. As the hot gas 100 expands through the turbine sections 28 and 18, the hot gas 100 flows over the concave pressure side 70 and the convex suction side 72 from the leading edge 66 to the trailing edge 68 during operation and the resultant pressure change is reacted through the airfoil region 64, into the neck region 74, into the innermost root region 60, and into the disk 45 in a conventional manner to produce power to drive the compressors 16 and 26, and the fan section 20. Residual pressurized hot gas 100, exits the nozzle region 40, and produces propulsion thrust.

The platform region 62 generally separates the root region 60 and the airfoil region 64 to define an inner boundary of the hot gas 100 flow path. The platform surface 101 of the platform region 62, is exposed to the hot gas 100. The innermost platform surface 102 of the platform region 62 is exposed to pressurized air supplied by the compressor section 26 or 16. The platform region 62 thereby separates the blade 28B into two regions of exposure, the outer region 101 of the blade 28B is exposed to hot gas 100, and the inner region 102 of the blade 28B is exposed to cooler pressurized air. The innermost root region 60 may include a neck region 74 that provides a transition to the platform region 62 and is typically not an aerodynamic member itself as the neck region 74 is below a flow bounding platform 76 of the platform region 62 and is thereby hidden from the hot gas 100 flow.

The root region 60 defines an attachment such as an inverted "fir tree," "bulb," or "dovetail" like shape so the blade 28B is slidably received in a complimentary configured recess 45R provided in the rotor disk 45. The complimentary configured recess 45R may be of an axial-entry or other interface arrangement.

Figure 3B:
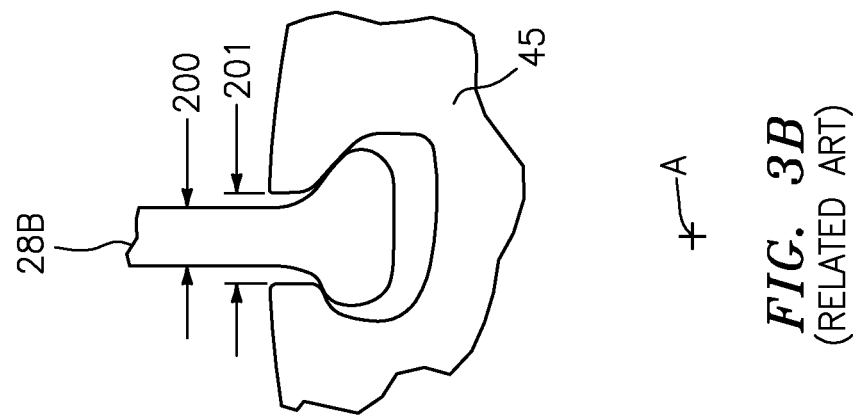
FIG. 3B is an expanded front view of the RELATED ART blade attachment.
Figure 3A:
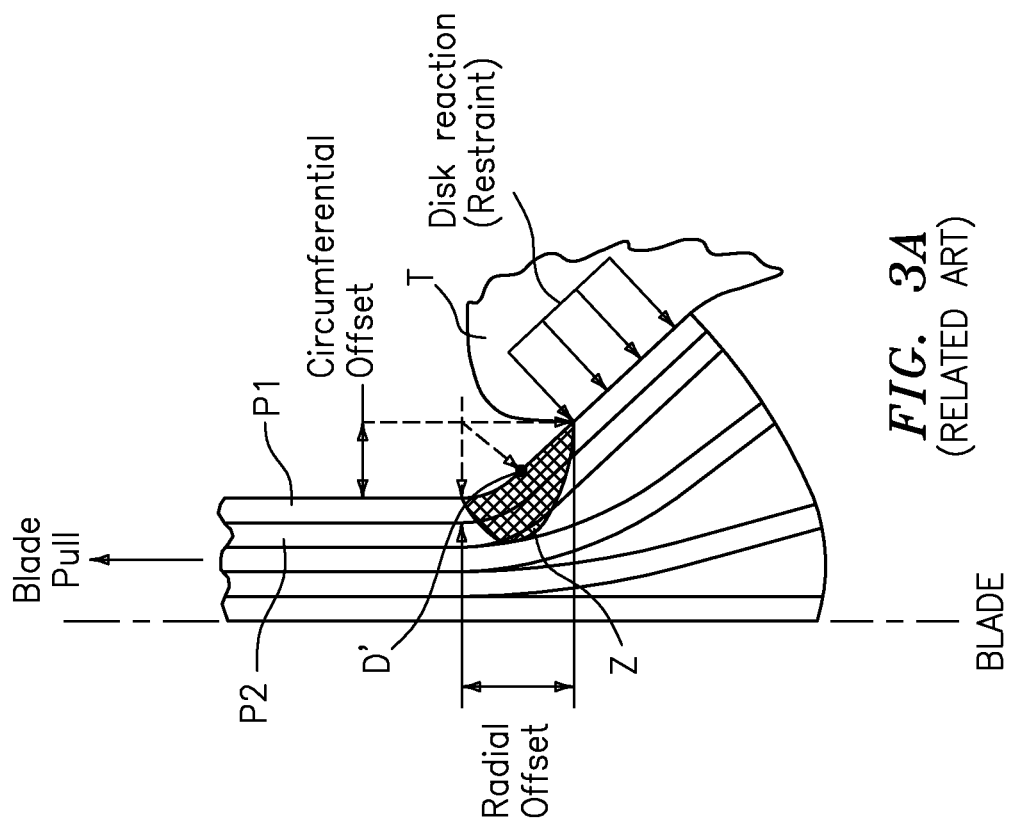
FIG. 3A is a schematic view of a RELATED ART blade attachment.

With reference to FIG. 3A and FIG. 3B (RELATED ART), a typical blade creates a radial pull due to centrifugal acceleration. The pull is a function of the mass of the blade 28B, the radial distance of the center of mass of the blade from the rotation axis A and the rotational velocity of the disk 45 and blade 28B rotor assembly. A typical blade and disk assembly has a root region design which includes a geometric offset both radial and circumferential between the root region 60 and the disk root region 45R.

During operation of the engine 10, temperature, pressure, and rotational speed changes occur, such that the dimensional width 201 of the disk root region 45R changes. The blade neck width 200 also changes during operation of engine 10, however due to material, temperature and stress differences between the disk 45 and the blade 28B, the change in the distances 200 and 201, during operation of engine 10 are different enough, that they must be accounted for in the design of the rotor assembly. In general practice, distance 201 is larger than distance 200, and includes the effects of part to part variation. Because distance 201 is larger than 200, a radial offset and circumferential offset is created between the disk root 45R and the blade neck region 74.

With reference to FIG. 3A, in the typical root region of a composite blade 28B, the radial offset and circumferential offset creates tensile stress between the outer plys P1 and inner plys P2. One form of the stress arises because the circumferential offset between a disk attachment T and a conventional blade root region requires a tensile stress across the plys to form and offset the moment internally created due to the offset. That is, the tensile blade pull generates a moment in addition to the radial pull to balance the internal stress formation (illustrated schematically at Z) that cause the outer ply P1 to peal away from the inner plys P2 which may cause full delamination. Since it is unlikely the disk attachment will always remain flush with the typical blade root region and maintain the circumferential offset at zero to avoid generation of the moment, the resulting interlaminar tensile/shear (ILT/ILS) region within the conventional composite blade becomes a potential limiting region dependant upon the capability of the composite material.

As defined herein, Interlaminar Tensile (ILT) stress is caused by the pulling of the layers apart, e.g., two adjacent plys separate by pealing away from each other. ILT is the stress needed to separate the two plys (force divided by layer to layer contact area). Interlaminar Shear (ILS) is the stress when two plys try to slide relative to each other, e.g., the stress (shearing force divided by the layer to layer contact area) required to force two plies to slide relative to each other. In complex shaped parts such as a CMC blade, the applied load caused by blade centrifugal pull is offset from the restraining force of the rotor disk to blade attachment interface. This offset may cause local bending stresses. Bending in all materials causes internal tensile stresses and shear stresses. Adding layers creates regions that are either the "layer" or the connection between the layers ("inter-layer"). Separation of the bond between layers is considered an Inter-Laminar delamination, and no further load can be transmitted between the adjacent layers. The calculated stress state at the delamination location, at the initiation of the separation can be related back to established ILT and ILS allowable stress limits and a maximum operational capability of the blade established. Since complex CMC components may have very low ILT/ILS allowable limits, regions exposed to high ILT/ILS are often the most limiting features of the components. Increasing the ILT/ILS allowable limits would increase the capability of the components.

Figure 4:
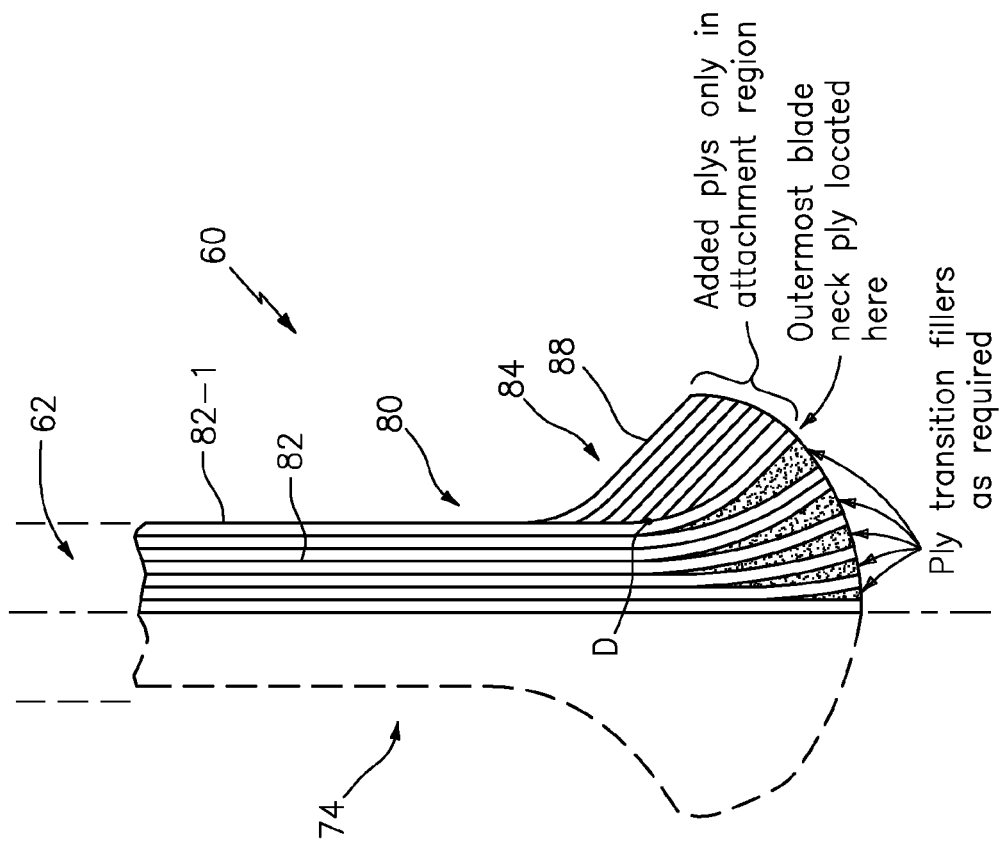
FIG. 4 is a schematic view of a blade attachment according to the present disclosure.

With reference to FIG. 4, the root region 60 disclosed herein provides a ply arrangement 80 such that high interlaminar tensile/shear regions are contained within regions of compressive stress to increase the total allowable ILT/ILS stress. Recent testing has shown a significant increase in ILT/ILS when the root region 60 is loaded in compression at high ILT/ILS is resistant to large radial blade pull.

The ply arrangement 80 provides a design methodology in which:

1) Regions of high ILT/ILS must be in a compressive stress region.

2) The offset area between the root region and disk attachment are accounted for with tolerances so that the actual contact surfaces are considered.

3) Ply sections that are offset from the disk attachment are located such that the zone of compression which emanate from the contact surface create a region with compression and the internal ply-to-ply interlaminar tension remains below the ILT/ILS capability for compression.

4) Ply sections outside of the compression zone have stresses below the ILT/ILS capability without compression.

The ply arrangement 80 generally includes an inner ply layer group 82 and an attachment ply layer group 84. The inner ply layer group 82 extends from the innermost root region 60 and at least into the intermediate platform region 62 to define the neck region 74 that transitions into the platform region 62. It should be understood that alternatively or additionally, the inner ply layer group 82 may continue outward to at least partially form the outermost airfoil region 64 (FIG. 2), however, various composite blade constructions will benefit herefrom as that disclosed herein is directed to the innermost root region 60 and the attachment which provides the interface with the fan disk 45

Figure 5:
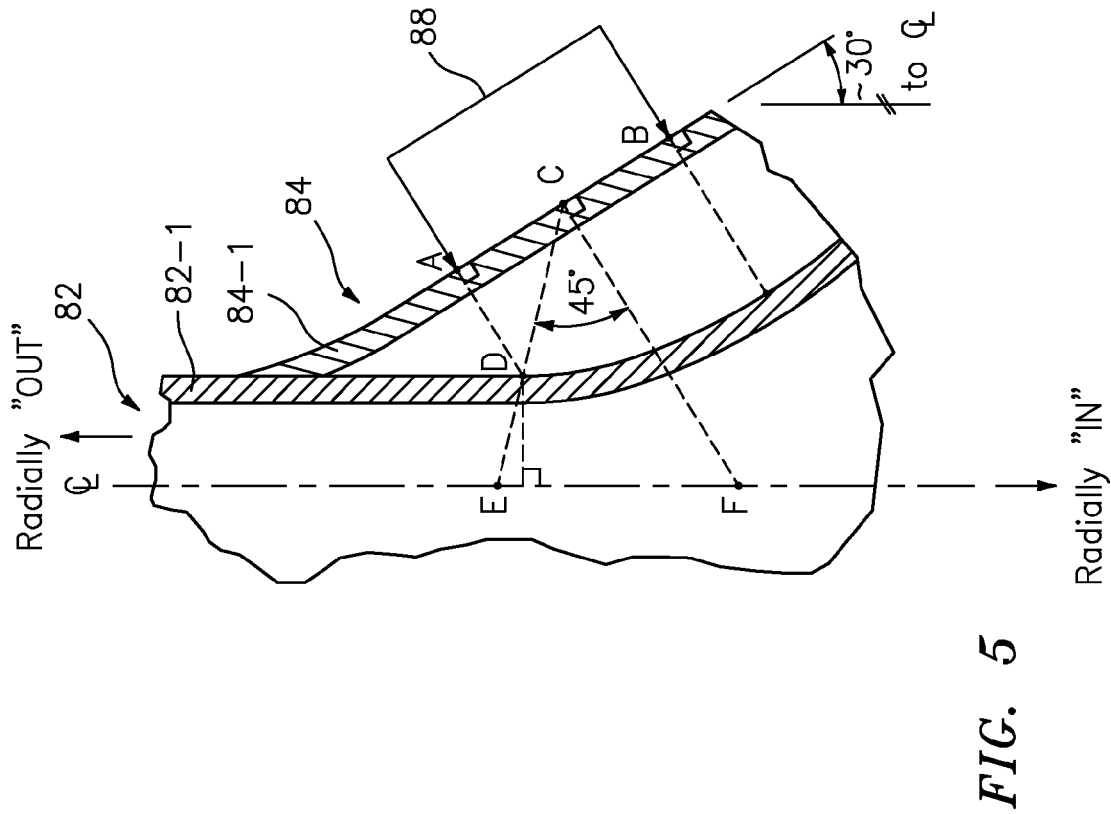
FIG. 5 is a force diagram of loads applied to the blade attachment.

With reference to FIG. 5, the inner ply layer group 82 includes an outermost ply 82-1 to which the attachment ply layer group 84 is attached. The attachment ply layer group 84 defines a contact surface 88 which fits within the recess 45R (FIG. 2) so as to provide the attachment interface. It should be understood that the outermost ply 84-1 of the attachment ply layer group 84 may be a "compliant" layer which have some resilient characteristics.

The contact surface 88 defined by line AB creates a "zone of compression" through the attachment ply layer group 84 and into the inner ply layer group 82. A midpoint of the "zone of compression" is represented by point C. Line CF is perpendicular to line AB and is extended perpendicular to the blade root centerline to define a point D at the outermost ply 82-1 of inner ply layer group 82. A transition of the outermost ply 82-1 to the wider portion of the attachment ply layer group 84, which defines the attachment such as the "fir-tree," "bulb," or "dovetail" shape, is radially inboard of point D such that all ply transitions upon the attachment ply layer group 84 occur in the compression zone as represented inboard of the line CE. The corresponding transition in FIG. 3A is outboard of point D'.

It should be understood that although half the contact surface 88 width AB was used as a starting point for this analysis, the non uniform modulus of composite material may require this to be changed (reduced). It may be preferred that the half width not be increased as half represents an empirical starting point that is believed to be conservative and useful for blade root/disk attachment sizing. Of course, this does not exclude such an increase.

Figure 6:
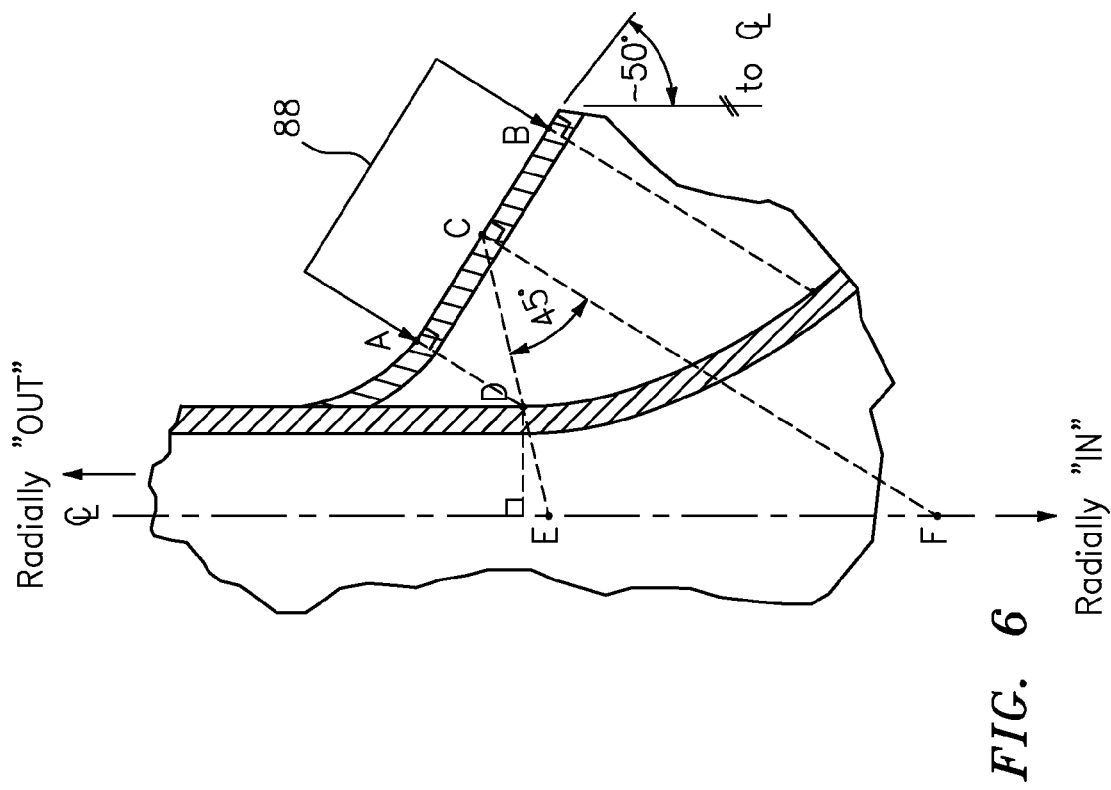
FIG. 6 is another force diagram of loads applied to the blade attachment.

In this non-limiting embodiment, the typical bolted joint methodology for accessing the bolted stack compression zone has been utilized to calculate the spring rate of the stack in compression. The contact surface 88 defined by line AB "zone of compression" is define at 30 degrees from the blade root centerline. It should be understood that other stack compression zone arrangements such may be defined such that the line AB "zone of compression" is define at 50 degrees from the blade root centerline (FIG. 6). That is, the outermost ply 84-1 from an outermost extent to the point D remains generally parallel to the blade centerline then transitions into an angled section such that the zone radially inboard of line CE remains in compression. Hence, a 45 degree angle defined from line CF defines line CD based on the bolted joint methodology to locate point D and thus the end section of the outermost ply 84-1 which is parallel to the blade centerline. The attachment ply layer group 84 is thereby arranged irrespective of whether point D is outboard (FIG. 5) or inboard of point C (FIG. 6). It should be understood that other interfaces may alternatively be provided.

Based upon test data, Applicant has learned that compressing composites across the plies significantly increases the interlaminar tensile and shear strengths. The design methodology takes that test knowledge, and creates a set of rules to capture the critical regions of the blade attachment in the compression zone created by the bearing stress associated with the blade to disk contact patch.

If the critical interlaminar stress is contained within the "compression zone," the allowable Interlaminar Tensile (ILT) and Interlaminar Shear (ILS) stress can be increased by a factor of 5-10. Thus making highly loaded blade attachments possible.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A root region of an airfoil comprising:
an inner ply layer group that extends from an innermost root region at least partially into an intermediate platform region, said inner ply layer group includes an outermost ply, said intermediate platform region includes a platform that has an upper surface from which an airfoil region extends and an opposed lower surface from which the innermost root region extends; and
an attachment ply layer group attached to said outermost ply, wherein said attachment ply layer group includes a contact surface from an end-point location (A) to an end-point location (B) in contact with a disk, with a first line extending perpendicularly from a mid-point location (C) of said contact surface between said end-point location (A) and said end-point location (B) and a second line extending at an angle of 45° to said first line and intersecting said mid-point location (C), said second line intersecting said outermost ply of said inner ply layer group at a location (D), with a third line intersecting location (D) and extending perpendicular to a centerline of said innermost root region, and an initial transition of said outermost ply of said inner ply layer group away from said centerline is radially inboard of said location (D).

2. The root region as recited in claim 1, wherein said attachment ply layer group at least partially defines a "fir tree" like shape.

3. The root region as recited in claim 1, wherein said attachment ply layer group at least partially defines a "bulb" like shape.

4. The root region as recited in claim 1, wherein said attachment ply layer group at least partially defines a "dovetail" like shape.

5. The root region as recited in claim 1, wherein said inner ply layer group extends from said innermost root region at least partially into said intermediate platform region and at least partially into an airfoil region.

6. The root region as recited in claim 1, wherein said inner ply layer group and said attachment ply layer group are ceramic matrix material.

7. A blade comprising:
an inner ply layer group that at least partially defines an innermost root region; and
an attachment ply layer group outboard of said inner ply layer group to define a remainder of said innermost root region, wherein said attachment ply layer group includes a contact surface from an end-point location (A) to an end-point location (B) in contact with a disk, with a first line extending perpendicularly from a mid-point location (C) of said contact surface between said end-point location (A) and said end-point location (B) and a second line extending at an angle of 45° to said first line and intersecting said mid-point location (C), said second line intersecting an outermost ply of said inner ply layer group at a location (D), with a third line intersecting location (D) and extending perpendicular to a centerline of said innermost root region, and an initial transition of said outermost ply of said inner ply layer group away from said centerline is radially inboard of said location (D).

8. The blade as recited in claim 7, wherein said attachment ply layer group defines a contact surface at which a disk attachment tooth interfaces.

9. The blade as recited in claim 8, wherein said contact surface defines a zone of compression through said attachment ply layer group and into said inner ply layer group.

10. The blade as recited in claim 8, wherein said inner ply layer group extends into an intermediate platform region and an airfoil region.

11. The blade as recited in claim 7, wherein said inner ply layer group and
said attachment ply layer group are ceramic matrix material.

12. The blade as recited in claim 7, wherein said inner ply layer group extends at least partially into an intermediate platform region, and said intermediate platform region includes a platform that has an upper surface from which an airfoil region extends and an opposed lower surface from which the innermost root region extends.

13. A method of increasing an allowable Interlaminar Tensile (ILT) and Interlaminar Shear (ILS) stress of a blade comprising:
providing an inner ply layer group that extends from an innermost root region at least partially into an intermediate platform region, said inner ply layer group includes an outermost ply, said intermediate platform region includes a platform that has an upper surface from which an airfoil region extends and an opposed lower surface from which the innermost root region extends, and an attachment ply layer group attached to said outermost ply;

mounting the innermost root region within a disk attachment such that the innermost root region is in compression;

defining a contact surface between the innermost root region and the disk attachment to form a zone of compression through the attachment ply layer group and into the inner ply layer group of the innermost root region, wherein the contact surface extends from an end-point location (A) to an end-point location (B) in contact with the disk attachment, with a first line extending perpendicularly from a mid-point location (C) of said contact surface between said end-point location (A) and said end-point location (B) and a second line extending at an angle of 45° to said first line and intersecting said mid-point location (C), said second line intersecting said outermost ply of said inner ply layer group at a location (D), with a third line intersecting location (D) and extending perpendicular to a centerline of said innermost root region, and defining an initial transition of said outermost ply of said inner ply layer group away from said centerline to be radially inboard of said location (D).

\* \* \* \* \*